United States Patent [19]

Murtuza

[11] Patent Number: 5,540,615
[45] Date of Patent: Jul. 30, 1996

[54] MACHINE BALANCER

[75] Inventor: Syed Murtuza, West Bloomfield, Mich.

[73] Assignee: The Regents of the University of Michigan, Ann Arbor, Mich.

[21] Appl. No.: 246,119

[22] Filed: May 19, 1994

[51] Int. Cl.$^6$ .................................................. B24B 41/00
[52] U.S. Cl. ........................................ 451/343; 451/342
[58] Field of Search .................................. 451/343, 342, 451/56; 310/323, 317, 328

[56] References Cited

U.S. PATENT DOCUMENTS

| | | | |
|---|---|---|---|
| 3,698,263 | 10/1972 | Ito | 451/343 |
| 3,918,326 | 11/1975 | Kida et al. | 451/343 |
| 4,445,398 | 5/1984 | Kerlin | 451/343 |
| 4,513,219 | 4/1985 | Katsuma et al. | |
| 4,562,374 | 12/1985 | Sashida. | |
| 4,713,571 | 12/1987 | Suzuki et al. | |
| 4,833,358 | 5/1989 | Suzuki et al. | |
| 4,871,937 | 10/1989 | Kawai | 310/323 |
| 4,873,477 | 10/1989 | Hirotomi. | |
| 5,198,714 | 3/1993 | Salomon et al. | |
| 5,231,325 | 7/1993 | Tamai et al. | 310/323 |
| 5,440,190 | 8/1995 | Imabayashi et al. | 310/323 |

*Primary Examiner*—Bruce M. Kisliuk
*Assistant Examiner*—Andrew Weinberg
*Attorney, Agent, or Firm*—Harness, Dickey & Pierce, PLC

[57] ABSTRACT

An in-process rotary machine balancer which utilizes a plurality of vibration wave motors with unbalanced rotor members for positioning the unbalanced rotors to cancel a measured imbalance of a rotating machine. Each unbalanced rotor member is positioned in rotation with respect to a rotating machine component by activating a respective vibration wave motor to orient the plurality of unbalanced rotor members to a desired trigonometric configuration which balances the rotating machine part. Preferably, an off-the-shelf vibration wave motor is modified by affixing an eccentric mass to the rotor member which provides the corresponding rotary imbalance. Preferably, a pair of vibration wave motors are utilized on a rotating machine shaft such that their initial configuration offsets and balances each respective eccentric mass in order to determine the imbalance of a rotating shaft. Corresponding rotation of each unbalanced rotor member produces a corresponding opposite imbalance which balances the rotating shaft.

11 Claims, 6 Drawing Sheets

MACHINE BALANCER

FIELD OF THE INVENTION

This invention relates generally to balancing of rotating machinery components, and more specifically to an in-process rotary machine balancer which utilizes a plurality of vibration wave motors for actively balancing a rotating part.

BACKGROUND OF THE INVENTION

The need for equipment and techniques to in-process balance rotating machinery parts is well recognized in industry. A variety of machines and methods are currently available. Typically, they involve a two-step process; first, detecting the amount and location of imbalance in a rotating part or element, and secondly, using this detected information to compensate for the imbalance. Techniques for detecting the amount and location of imbalance are readily available and well understood. However, for many cases including balancing of grinding machinery, only in-process balancing will produce desirable results.

One technique for in-process balancing uses a pair of rotatably movable motor driven eccentric weights which are rotated into position to in-process balance a rotating machine part. Each weight is driven into position by a conventional electric motor through a precision gear train, with the weights being repositioned through the gear train to offset an imbalanced part. Most commonly, this technique is used to balance grinding wheels. However, this technique is only suitable for low speed and low acceleration applications since higher speeds affect the gear train and the corresponding acceleration forces tend to strip the gears. Additionally, it is not suitable for balancing small grinding wheels or small machine parts and it is relatively expensive and can not be mounted on a spindle.

A second existing system utilizes a balance unit having a compartmentalized cylindrical structure which forms four chambers within the inner periphery of the cylinder. A fluid, preferably water, is then injected into each of the chambers from a stationary reservoir through a set of stationary nozzles. The water is introduced into the chambers in a controlled and proportioned manner to compensate for the imbalance. However, this system is very costly and only suitable for balancing large machine elements such as large grinding wheels. Additionally, it is not suitable as a retrofit to balance existing machine parts. Furthermore, fluid leakage can result in water or fluid being splashed onto a factory floor which creates a maintenance problem. Once the chambers are completely filled due to accumulation during the balancing process, the machine part, or grinding wheel, has to be stopped and the chambers have to be emptied in order to start from scratch again. One variation provides for emptying the chambers while the system is in position and in motion, but it increases the overall system cost significantly.

A third balancing system utilizes a self contained four chamber unit similar to the previously cited unit. Each of the chambers is partially filled with Halon, a fluid which evaporates and condenses easily. Pairs of chambers located diagonally opposite another are fluidly interconnected with a tube which allows for the transfer of Halon by heating and evaporating Halon fluid in one of the chambers which forces the evaporated Halon to move to the corresponding chamber diagonally opposite the heated chamber where it is cooled and condensed. However, there are environmental concerns with using Halon. Additionally, response rate is very slow due to the large thermal time constants. Likewise, it is difficult to develop a control strategy for the resulting open loop system, a system which produces large delays that cause overcorrecting, and which makes small corrections tricky to consistently perform. Furthermore, this system is costly and not suitable for machine spindle balancing, or for balancing on small diameter machine parts or driving wheels.

A fourth alternative system is one similar to the preceding third system which has four chambers with diagonally opposed cross chambers connected by a tube routed about the periphery of the unit. This system is self contained. However, a different type of fluid, such as water, is used and a different method is used to transfer fluid in order to balance a part. To facilitate fluid transfer, a pair of peristaltic pumps is controllably operated to transfer the fluid between the chambers. However, while this system is somewhat less expensive than previous systems, it is still too large in size for use with smaller diameter grinding wheels or high speed spindles.

SUMMARY OF THE INVENTION

The present invention has for its primary object the provision of a novel machine balancing system utilizing a pair of eccentric mass vibration wave motors which position their mass to offset a measured imbalance in a machine part. The result is achieved in a reliable and economical manner in such a way that it does not pose inherent fluid containment problems, it is easy to tune and compensate for the measured imbalance, it can be applied to a broad range of spindle sizes and machine elements, and it can be implemented at high speeds.

More specifically, the present invention contemplates a pair of vibration wave motors each consisting of a rotor, a metallic stator resonator, and an array of piezoelectric ceramic elements arranged in two groups on a sheet such that the ring, resonator and sheet are stacked one on top of the other in a nested and pressurized relation as imparted by a pressurizing spring. The ceramic sheet is glued or bonded to the stator resonator, with the sheet having a conductive coating on either side. The opposite sides of each group of ceramic elements are connected across an alternating voltage source with each 90° out of phase with respect to the other. Application of the voltage acts on the piezoelectric ceramic elements to cause the resonator to vibrate and create a travelling wave in the stator resonator which acts on the rotor through friction applied by the spring to impart rotary motion to the rotor through the friction coupling.

The construction and theory of operation for these motors is disclosed in U.S. Patent Nos: 4,513,219, 4,562,374, and 4,779,018 which are incorporated herein by reference. To achieve the rotary machine balancer of this invention, a plurality of vibration wave motors are modified by adapting the motor's rotor ring to provide an eccentric, or unbalanced, mass. By actuating the motor, which has inherent high torque and low speed characteristics, the eccentric mass motor rotor is rotated to a desired angular position in each of the plurality of motors such that the eccentric mass offsets the unbalanced forces and moments of the machine part in question.

By arranging a plurality of vibration wave motors about an unbalanced rotating machine part, the eccentric mass rotor rings can be positioned with their respective motors to offset the imbalance. If a pair of wave motors is utilized, each motor is assembled in an initial configuration such that the pair of unbalanced rotor rings have their imbalance offset at 180° increments so they cancel each other out. By measuring the imbalance of the rotating machine part, each motor is then rotated a desired amount to counterbalance the known calculated imbalance in order to achieve balanced forces and moments.

Objects, features and advantages of this invention are to provide a machine balancer using a plurality of vibration wave motor actuated eccentric masses which can operate at low speeds with high torque characteristics. Additionally, gears and gear reduction mechanisms which typically cause problems in high acceleration applications are eliminated. Furthermore, the eccentric mass vibration wave motors of this device can be accurately and precisely rotated to a desired angular position which allows angular resolution of the eccentric mass positioning on the order of one thousandth of a degree. All of the preceding are provided in a machine balancer which is of simplified design and economical manufacture and assembly, is easy to implement on large or small parts, and can be configured in a disk or ring type configuration.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
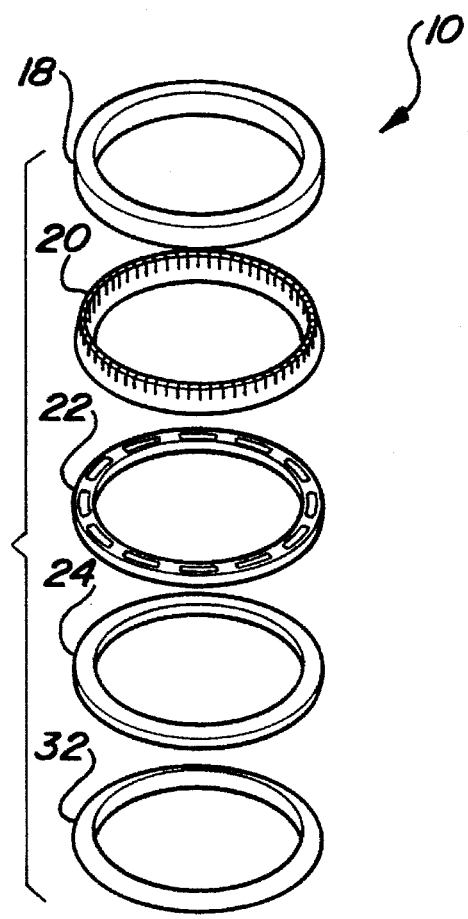
FIG. 1 is an exploded perspective view of a vibration wave motor for use in a vibration wave motor balancer in accordance with this invention.
Figure 2:
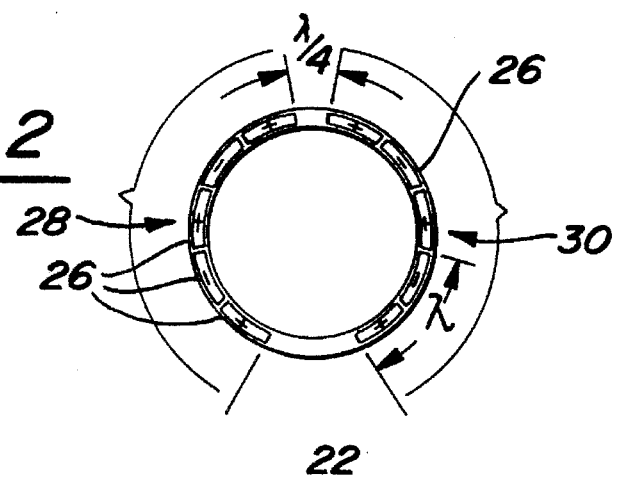
FIG. 2 is a plan view showing in detail a piezoelectric ceramic sheet utilized in the vibration wave motor depicted in FIG. 1.
Figure 3:
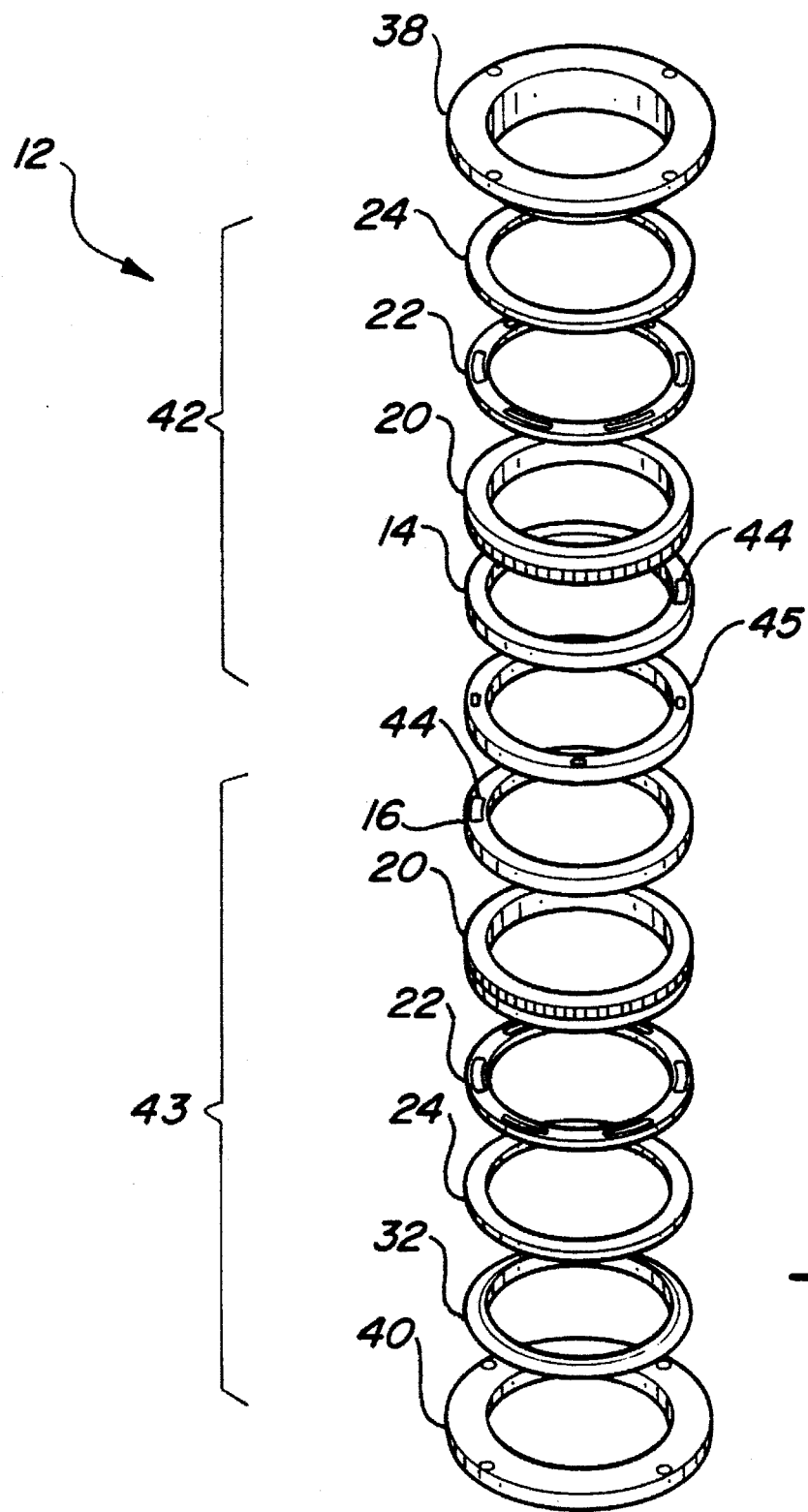
FIG. 3 is an exploded perspective view of a vibration wave motor balancer constructed with two vibration wave motors having eccentric mass rotors depicted in an opposed and balance configuration.
Figure 4:
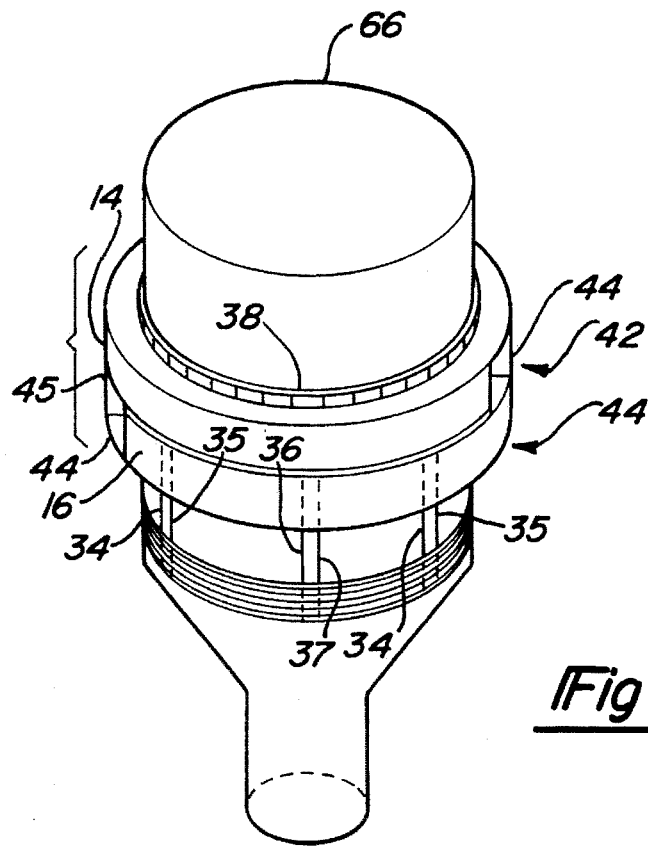
FIG. 4 is an assembled perspective view of the vibration wave motor balancer depicted in FIG. 3 as installed on a rotating spindle.

FIGS. 1 and 2 depict a vibration wave motor 10 and its constituent components utilized in constricting the vibration wave motor balancer 12, depicted in FIGS. 3 and 4, of this invention. Wave motors of this type are readily commercially available and are disclosed in the aforementioned U.S. patents, namely, U.S. Pat. Nos. 4,513,219, 4,562,374, and 4,779,018, which are incorporated herein by reference. The construction and operation of these devices is detailed in these patents. FIG. 3 depicts the vibration wave motor balancer 12 of this invention which utilizes a pair of modified vibration wave motor rotors 14 and. 16 to apply a counteracting imbalance which cancels out an imbalance on a rotating machine part. Motors with rotors 14 and 16 are constructed by modifying a pair of commercial wave motors, such as motor 10 depicted in FIG. 1.

Referring to FIG. 1, a commercially available vibration wave motor 10 has a rotor ring 18 which is rotatably retained against a stator resonator 20, and a piezoelectric ceramic sheet 22 which is bonded to the opposite side of the resonator. Two phase excitation of the ceramic sheet 22 results in a travelling wave which is propagated through the resilient stator resonator 20 causing it to impart circular motion to the rotor 18. The vibration damper or absorber 24 is provided against the bottom side of the ceramic sheet 22 to suppress propagation of the travelling wave towards the compression spring or the flange. The ring, resonator and sheet when mounted on a rotating part are forcibly retained together in contact with a biasing compression spring 32 affixed to the part. Alternatively, rotating discs may be substituted for the rings when constructing a vibration wave motor.

The piezoelectric ceramic sheet 22 has a pattern of piezoelectric ceramic elements 26 of adjacent opposite polarization which are dimensioned to provide a half wave length size which corresponds to the ultrasonic frequency of excitation for the elements as arranged and shown in FIGS. 1 and 2. Two groups 28 and 30 are formed by elements 26 such that the adjacent elements, or segments, in each group have opposite polarization. Alternatively, two semi-circular segments of the piezoelectric ceramic may have half wave length areas polarized with opposite polarity. In either case, the top sides of segments, or elements, in each group are connected to a different phase of a two phase (90° phase difference) ultrasonic frequency (AC) signal. The bottom sides are connected to the supply (ground). The two phase AC excitation across a piezoelectric ceramic element propagates surface waves through the stator resonator which frictionally coacts with the rotor ring and drives it in rotation. These surface waves comprise expanding and contracting waves within the sheet which imparts resilient waves through the stator resonator and drive the rotor ring in rotation. The top of all the elements in group A as shown in FIG. 2 is connected to one phase of the AC supply. The top of all the elements in group B as shown in FIG. 2 is connected to the other phase of the AC supply. The bottom of all elements in groups A and B is connected to the neutral of the AC supply.

To facilitate the frictional coaction between the rotor ring and resonator, the biasing or compression spring 32 is seated beneath the piezoelectric ceramic sheet and acts against the vibration damper 24 to compliantly bias the sheet against the resonator and the resonator against the rotor ring, as the rotor ring is biased against an axial end abutment surface, for example a raised flange 38 retained on a machine shaft or spindle and an opposed collar flange 40. A central opening in each ring, the flange, and spring provide means for mounting each motor to a rotating part. Further understanding of the coaction between components, as well as the design of phase biased piezoelectric segments in a ceramic sheet is more readily described in the aforementioned patents incorporated by reference.

Figure 6A:
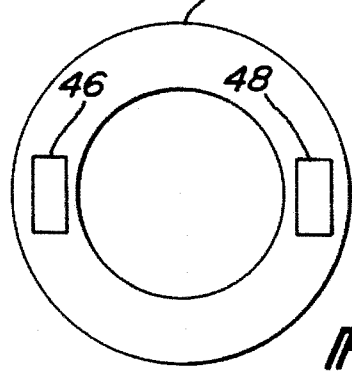
Figure 6B:
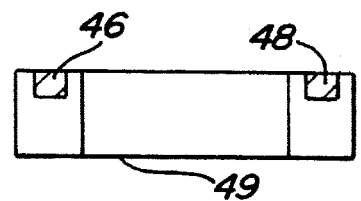

The vibration wave motor balancer 12 depicted in FIG. 3 in an exploded view is constructed by substituting a modified vibration wave rotor 14 and 16, respectively, in each of a motor 42 and 43. A rotary thrust bearing 45 is further provided between each motor. The modified rotor ring is designed with an imbalance in a selected location, and is preferably constructed by excavating mass from an outer peripheral portion of the motor's existing rotor ring to form a local void 44, as shown in FIG. 3. Furthermore, rings 14 and 16 can be constructed by inserting a pair of opposed unequal masses 46 and 48 within recesses in a ring 49, as shown in FIG. 6.

Figure 5A:
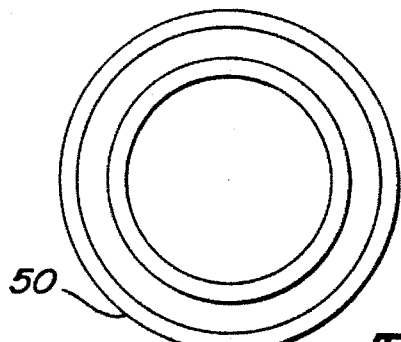
FIGS. 5–7 are plan views (a) and centerline sectional views (b), respectively, of various mass unbalanced rotor ring configurations.
Figure 5B:
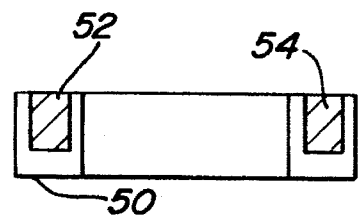

Alternatively, as shown in FIG. 5 the rotor ring can be constructed from a grooved circumferential ring 50 which receives semi-circular weights 52 and 54 of differing mass to unbalance the ring.

Figure 7A:
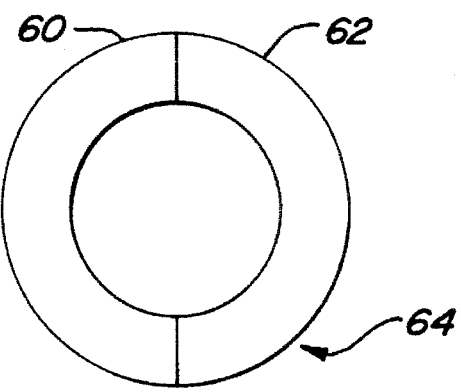
Figure 7B:
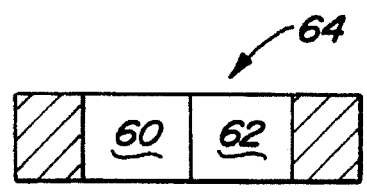

In a third configuration depicted in FIG. 7, a pair of circumferential segments 60 and 62 are mated to form the solid rotor ring 64. In this case, segment 62 is constructed of a material with a greater density than that used to construct segment 60, thereby creating an eccentric imbalance in the rotor ring. Further variations can include excavation of either or both segments in order to tune the imbalance in the ring.

In FIG. 4, modified vibration wave motors 42 and 43 in machine balancer 12 are shown in a balanced pretest position mounted on a machine spindle by a pair of retaining collars or flanges 38 and 40 where each rotor ring 14 and 16 is positioned such that each corresponding eccentric rotor mass is positioned opposite the other. A plurality of phase and neutral leads 34 and 35 are provided on the spindle which extend from under each motor, respectively, where they communicate with a plurality of respective electro-strained elements in each motor's piezoelectric ceramic sheet 22 from the pair of motors 42 and 43 which respectively include unbalanced rotors 14 and 16. A pair of slip rings 74 and 76 are further provided on the spindle such that slip rings 74 and 76 provide phase and neutral interconnection with respective corresponding phase and neutral leads 34 and 35 leading from first motor 42 having unbalanced rotor 14 and second motor 43 having unbalanced rotor 16, and slip rings 78 and 80 provide for electrical interconnection with corresponding positive and negative leads 36 and 37 which connect with a clutch (not shown) as disclosed below in FIG. 9. These electrical interconnections communicate with the electro-strain elements such that connection through the slip rings provides for activation and deactivation of each respective motor correspondingly. By oppositely positioning the unbalanced rotor rings, any dynamic imbalance due to the rings is eliminated, and the machine spindle 66 being tested can be rotated along with machine balancer 12 in order to determine the imbalance in the shaft. Alternatively the power to the balancer including the clutch may be provided by means of transformer action to eliminate the slip rings.

Here, traditional techniques are used to determine rotating shaft imbalance, by using force transducers as sensing means at either end of the shaft to measure resulting forces about the shaft. By summing measured forces, a resulting oppositely acting force can be determined which cancels out the imbalance in the shaft to achieve nullity values for force and moments. Simple trigonometric calculations are then used to determine a desired configuration for the pair of rings which produces the corresponding resulting oppositely acting forces and moments on the shaft which cancel out the measured imbalance of the machine shaft.

Likewise, traditional techniques can be utilized to measure resulting moments about a shaft, and by measuring such moments a resulting oppositely acting moment can be determined which cancels out the imbalance due to the moment in the shaft. However, to balance moments requires utilization of two sets of balancers, and is generally not necessary. For applications where it is necessary, such sets of balancers will be utilized, preferably in an appropriately spaced apart arrangement on a shaft.

Preferably, each rotor ring is constructed with an identical mass imbalance in order to simplify the trigonometric calculations when balancing a shaft. Additionally, a simple control routine is utilized to trigger start up and run of rotors 14 and 16 which orients each rotor rotatably into a desired position about the unbalanced shaft, forming sequential control means, such that the rotating shaft is balanced. For example, a simple version for providing a means of control consists of an operator monitoring force imbalance in a shaft and balancer system from accelerometers wherein the operator manually activates one or both motors to rotate the unbalanced rotor to a position which offsets the measured imbalance. Such an approach is an operator "touch and feel" adjustment which rotates the rotors until a position is found which balances the system. Simple control schemes can be substituted for the operator's human judgment. Once the desired rotary ring position is achieved, each respective motor is turned off, which leaves each unbalanced ring in a fixed position with respect to the shaft. Therefore, the motors are only actuated when balancing the shaft which increases the life of the motors, and in use, they are typically turned off.

Figure 8:
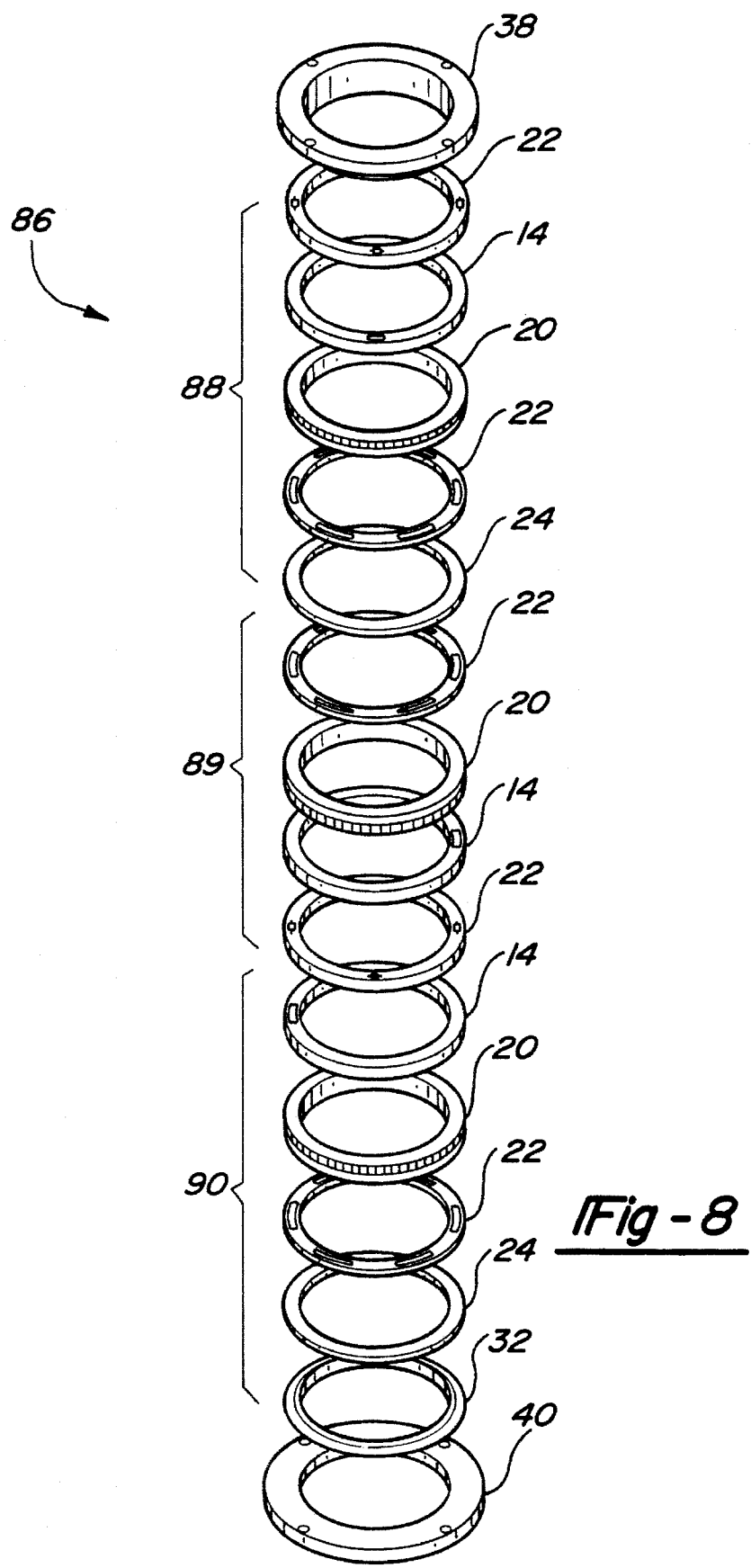
FIG. 8 depicts a velocity wave motor balancer with three velocity wave motors.

Alternatively, FIG. 8 depicts an exploded view of a velocity wave motor balancer 86 utilizing an array of three velocity wave motors 88–90 similar to those used in FIG. 3, each with identical eccentric mass rotor rings 14. By arranging the mass imbalance between each ring in a rotated orientation which is angularly spaced 120° apart, the cumulative mass between the three rings is balanced. As before, the shaft imbalance can then be measured. Corresponding trigonometric calculations are then used to determine the resultant force created by the shaft imbalance. The three rings are then positionally rotated to produce an oppositely acting resultant force which corrects out the imbalance produced by the rotating shaft or machine part. Similarly, various other combinations and arrangements of vibration wave motors are possible which utilize four or more motors having unbalanced rings.

Figure 9:
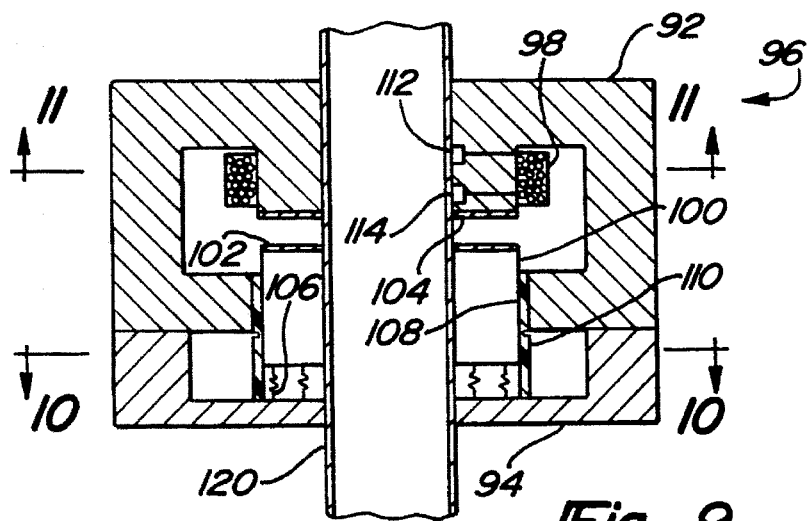
FIG. 9 illustrates a modified rotor and stator for use in a velocity wave motor balancer as depicted in FIGS. 3 and 8 wherein the modifications provide an axially actuatable auxiliary clutch for locking the motor rotor during rotational speed transients.
Figure 10:
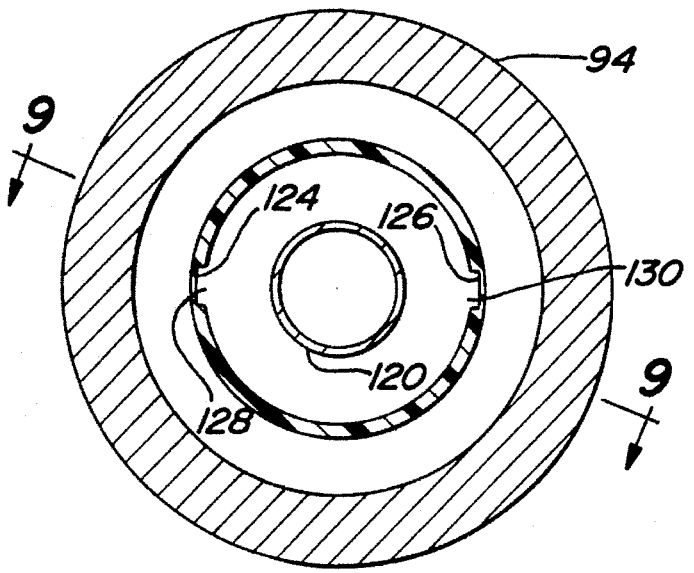
FIG. 10 is a cross-sectional view taken along line 10—10 of FIG. 9.
Figure 11:
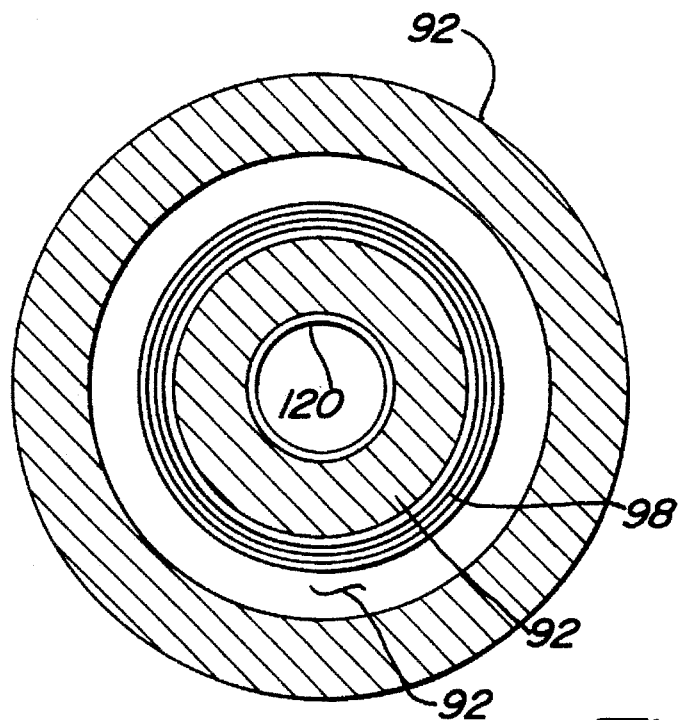
FIG. 11 is a cross-sectional view taken along line 11—11 of FIG. 9.

FIGS. 9–12 illustrate a modified motor rotor 92 and stator 94 which forms an auxiliary clutch 96 for locking the rotor during severe speed transients, and which can be incorporated on vibration wave motors such as motor 42 depicted in FIGS. 3 and 4. Such transients may arise during start-up when a machine spindle on which the corresponding motor is mounted ramps towards a desired angular velocity, or during the time when the machine tool (cutter, grinder, etc.) is working. In its preferred embodiment as shown in FIGS. 9–11, the modified motor rotor 92 is constructed of a magnetic material, and is modified to accommodate a solenoid 98 which when actuated, pulls in a cylindrical magnetic plunger 100 which makes frictional contact with the rotor. The contacting surfaces 102 and 104 of the plunger and rotor, respectively, are coated to give a large coefficient of friction. The plunger is restrained in a bias mode toward the motor stator at the other end by a spring or springs 106. Non-magnetic sleeves 108 and 110 on the rotor and the stator, respectively, house the plunger and provide a gliding surface during actuation. A pair of electrically conductive bushings 112 and 114 apply current to the solenoid from a pair of contacting circular conductor bands 116 and 118 provided on the motor assembly sleeve 120, as further shown in FIG. 12. A pair of axial grooves 124 and 126 are provided in the motor's non-magnetic sleeves which axially guide the plunger by mating with complementary axial tabs 128 and 130 formed in the plunger.

Figure 12:
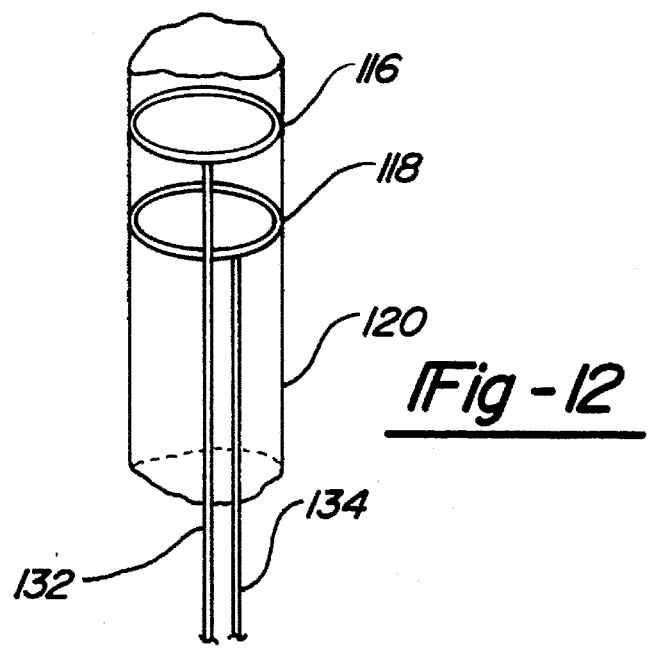
FIG. 12 is a partial schematic perspective view of a pair of circular conductor bands which contact respective clutch solenoid brushes shown in FIG. 9.

As depicted in FIG. 12, the circular conductor bands 116 and 118 each individually arranged on each motor to contact one of the clutch solenoid brushes 112 and 114 of FIG. 9 which electrically conductively activate and deactivate the solenoid 98 by way of a pair of conductive paths 132 and 134 which communicate with a pair of slip rings 78 and 80 external to the motor. The circular conductive bands are provided on sleeve 120 on which the motor is assembled as a unit. Alternatively, a pile of piezoelectric ceramic or similar material which elongates and contracts with application of voltage across it may be used as a clutch in place of the electromagnetic clutch described above.

It is to be understood that the invention is not limited to the exact construction illustrated and described above, but that various changes and modifications may be made without departing from the spirit and scope of the invention as defined in the following claims.

I claim:

1. An in-process rotary machine balancer comprising:

a plurality of vibration wave motors each having a vibration member with an electro-strain converting element for generating a vibration wave by applying an electric signal to said electro-strain converting element, a moving unbalanced rotor member, and a pressurizing spring for biasing said rotor member in contact with said vibrating member such that said vibrating wave drives said rotor in rotation to produce a rotating imbalance;

mounting means for retaining said vibration wave motors on a rotating machine part in coaxial relation;

sensing means for detecting rotary imbalance in a machine element; and control means for rotatably positioning each of said unbalanced rotor members to a desired rotary position relative to said rotating machine element by imparting respective electrical signals to each of said vibrating wave motors which rotates said rotor members to positions which offset said sensed rotary imbalance which imparts balance to the rotating machine element.

2. The in-process rotary machine balancer of claim 1 wherein said unbalanced rotor member is provided by affixing an eccentrically positioned mass to said rotor ring such that said rotor ring becomes rotationally unbalanced.

3. The in-process rotary machine balancer of claim 1 wherein said unbalanced rotor member is provided by excavating a cavity in said rotor member such that said rotor member becomes rotationally unbalanced.

4. The in-process rotary machine balancer of claim 1 wherein said unbalanced rotor member is a rotatable disk.

5. The in-process rotary machine balancer of claim 1 wherein said unbalanced rotor member is a rotor ring.

6. The in-process rotary machine balancer of claim 1 wherein said unbalanced rotor member is constructed by joining a pair of hollow circumferential tubes to provide a hollow circumferential ring, wherein at least one of said tubes receives a mass positionally affixed therein such that one of said tubes has a greater mass than the other of said tubes to produce an unbalanced circumferential ring.

7. The in-process rotary machine balancer of claim 1 wherein said unbalanced rotor member is formed by mating a pair of arcuate segments having differing masses to provide an unbalanced rotor ring.

8. The in-process rotary machine balancer of claim 1 further comprising an axially movable clutch controllably operable for locking said rotor rings to prevent rotation of said rings with respect to said vibration wave motors, as well as said rotating machine element.

9. An in-process rotary machine balancer comprising:

a plurality of vibration wave motors each having a vibration member with an electro-straining converting element for generating a vibration wave by applying an electric signal to said electro-straining converting element, a moving rotor member, and a pressurizing spring for biasing said rotor member in contact with said vibrating member such that said vibrating wave drives said rotor in rotation, and a mass carried on a portion of said rotor member to produce an imbalance as said rotor member rotates;

mounting means for retaining said vibration wave motors on a rotating machine part in coaxial relation;

sensing means for detecting rotary imbalance in a machine element; and control means for rotatably positioning each of said unbalanced rotor members to a desired rotary position relative to said rotating machine element by imparting respective electrical signals to each of said vibrating wave motors which rotates said rotor members to positions which offset said sensed rotary imbalance which imparts balance to the rotating machine element.

10. The in-process rotary machine balancer of claim 9 wherein said rotor member is a rotatable disk.

11. The in-process rotary machine balancer of claim 9 wherein said rotor member is a rotor ring.

* * * * *